United States Patent [19]

Deussner et al.

[11] 3,986,818

[45] Oct. 19, 1976

[54] DEVICE FOR THE THERMAL TREATMENT OF FINE GRANULAR MATERIAL WITH BURNING MEANS WITH A HEAT EXCHANGER SYSTEM

[75] Inventors: Herbert Deussner; Kunibert Brachthäuser; Hubert Ramesohl, all of Bensberg; Horst Herchenbach, Troisdorf, all of Germany

[73] Assignee: Klockner-Humboldt-Deutz Aktiengesellschaft, Cologne, Germany

[22] Filed: Dec. 16, 1974

[21] Appl. No.: 533,130

[30] Foreign Application Priority Data

Dec. 14, 1973 Germany.............................. 2362132

[52] U.S. Cl.................................. 432/14; 34/57 R; 432/106
[51] Int. Cl.² ......................................... F27B 15/00
[58] Field of Search ................. 432/14, 15, 106, 58; 34/57 R, 57 A, 57 E

[56] References Cited
UNITED STATES PATENTS 3,864,075  2/1975  Christiansen ....................... 432/106

3,881,861  5/1975  Ritzmann ............................. 432/14

FOREIGN PATENTS OR APPLICATIONS 1,253,318  7/1961  France ................................ 34/57 R

*Primary Examiner*—John J. Camby
*Attorney, Agent, or Firm*—Hill, Gross, Simpson, Van Santen, Steadman, Chiara & Simpson

[57] ABSTRACT

A method and apparatus for thermally treating fine granular material such as for the calcining of cement including a furnace for completing the thermal treatment of the material having a burner therein with the material is first received by parallel plural stage separator systems each having plural cyclone separators, wherein the material is heated by hot exhaust gases and material supplied from first and second separator systems to first and second parallely arranged preheater chambers each having their own burner and receiving the full flow of exhaust gases from a furnace to the separators feeding to the preheater chamber and the preheater chambers connected to discharge their exhaust gases to the separator systems, and the final stage of each separator system discharging the material directly to the furnace.

10 Claims, 1 Drawing Figure

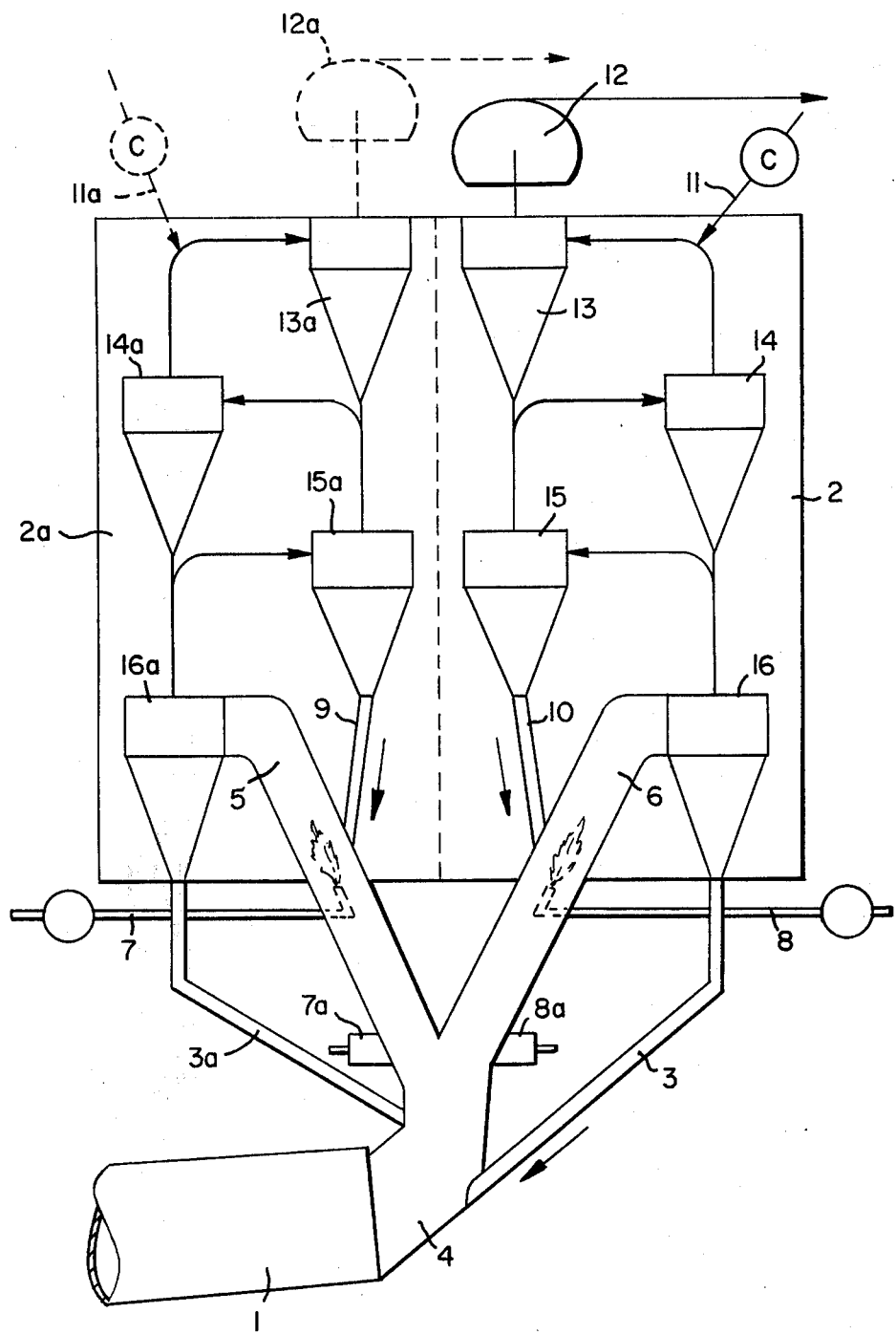

DEVICE FOR THE THERMAL TREATMENT OF FINE GRANULAR MATERIAL WITH BURNING MEANS WITH A HEAT EXCHANGER SYSTEM

CROSS REFERENCE TO RELATED APPLICATIONS

This application is related to the prior application of Herbert Deussner et al., Ser. No. 507,378, filed Sept. 19, 1974, now abandoned.

BACKGROUND OF THE INVENTION

This invention relates to apparatus for thermally treating pulverized or pulverulent material such as the raw material which is burned in calcining for the preparation of cement, and more particularly to an apparatus which includes a furnace, such as a rotary kiln for the final complete burning or calcining of the material and which delivers its exhaust gases to parallelly arranged first and second preheating chambers to preheat the material onto a plurality of sets of cyclone separators which utilize exhaust gases for further preheating and precalcining.

As recognized in the above referred to Deussner et al. application, Ser. No. 507,378, now abandoned, devices have heretofore been provided in the prior art for the heating of pulverized material and for the calcining of cement such as shown and described in the published German Patent application No. 1,184,744 for the production of alpha-aluminum oxide from aluminum oxide hydrates.

The aforementioned Deussner et al. application, Ser. No. 507,378, now abandoned, has provided a device for the thermal treatment of earth alkaline carbonates in which there is an effective and efficient thermal treatment for pulverized raw material, and which is particularly suitable for use in the commercial manufacture of cement. According to Deussner et al., a preheating chamber is provided in advance of the main furnace or kiln or calcining chamber. Additional thermal energy is provided in the preheating chamber by a burner which is so positioned that the flow of gases from the furnace feed into the preheating chamber in advance of the inlet of the material feed conduit. Material arrives flowing against the direction of flow of exhaust gases from the furnace. At the area of the inlet point of the burner, a secondary air feed conduit discharges into the preheating chamber. The material is preheated with the hot exhaust gases coming from the furnace, and is partially calcined in this chamber. The preheating calcining zone accomplishes an almost complete irradiation of the $CO_2$ when the apparatus and method are used in the manufacture of cement, and the structure is used before the introduction of the raw material into a rotary kiln or furnace. With the preheating chamber and the passing of the material through a series of cyclone separators, a substantially complete calcining of the material is obtained before introduction thereof into the rotary kiln. This permits reduction in the size of furnace and the thermal load carried thereby. As a result, only the heat which is required for the sintering process is introduced into the rotary kiln. With this structure, as mentioned above, a partially calcined material which is preheated by means of hot exhaust gases in the preheating device, for example, pulverized raw material used in the manufacture of cement, is fed in a finely dispersed form and distributed uniformly practically over the entire front cross section and into direct contact with the combustion zone so that an almost complete calcining, that is, an also complete expulsion of the $CO_2$ is attained in the case of pulverized raw material used in the manufacture of cement, before introduction of the material into the rotary kiln.

In the above referred to devices, the deacidification of the cement raw material in the heat exchange system may be almost completely carried out in advance of the rotary furnace so that in the rotary kiln, only the clinker formation, that is, the finished burning needs to be carried out. This results in an appreciable thermal release in the rotary kiln so that an increase in yield without noteworthy increase in dimensions of the device is possible. However, with the preheating mechanisms in advance of the furnace, particularly with large yields, difficulties are encountered in conducting the additional combustion zones optimumly. Difficulties are also encountered with variation in load conditions to attain the desired complete calcination of the charging material before introduction into the furnace.

It is, accordingly, an object of the present invention to improve mechanism such as described so that it will satisfy a wide variation of requirements of operation and may be used and constructed independently of size dimensions.

In accordance with the present invention, the flow of exhaust gases from the furnace is divided into at least two separate paths to be conducted through parallel preheat chambers, each of which is provided with an independent fuel supply. This provides that even with devices for the largest output commercial yields, the flow cross-section in the area of the additional combustion zone in the preheater may be limited. This obtains an optimum utilization of fuel. This further obtains an optimum deacidification of the raw material in the partial stream. In the essentially flameless combustion that occurs due to the reaction of the exhaust gases from the furnace in the separate preheating chambers with the material being fed therein, an essentially disturbance free and almost complete deacidification of material can be attained. Also, by partial load adjustment for the preheat chambers which is enhanced by the limitation of the size of the individual flow cross-sections of the preheat chamber, a homogeneous dispersion of the raw material occurs. This permits operation with a relatively uniform flow of the material into the preheat chamber and of the gases from the furnace through the preheat chamber. For deacidification of fine granular cement raw material, the quantities of fuel introduced react with the quantities of oxygen contained in the furnace exhaust gases or react with additionally introduced heated combustion air during the release of heat. Through the high utilization of heat in the deacidification operation in the preheat chamber, so much heat is utilized that no flame can develop so that with proper distribution as is accomplished with the present arrangement, complete deacidification can be obtained at very high flow volumes generating heat with the introduction of fuel and oxygen without the development of a flame, and yet attaining high heat utilization. Disadvantages of previous structures are prevented which encounter problems due to bad distribution or disturbances caused by caking or banking of the materials, and this can occur if sintering occurs through uneven heat treatment.

DRAWINGS

Further objectives and advantages will be seen, as well as equivalent structures and methods which are intended to be covered herein, from the teaching of the principles of the invention in connection with the description of the preferred embodiments as described in the specification and claims and shown in the single FIGURE of the drawings which illustrates the structure in a somewhat diagrammatic form.

DESCRIPTION

Heat exchanger and separator systems 2 and 2a are connected in series with a rotary furnace or kiln 1. The rotary furnace has a fuel supply which may be provided with a separate supply of oxygen shown schematically at 1b to supply a burner 1a.

The heat exchanger separators systems 2 and 2a preferably comprise a plurality of separator stages such as cyclone separators connected consecutively so that the exhaust gas from each of the series of cyclones feeds to a preceding cyclone so that the heat energy from the exhaust gases is used in the separation treatment occurring in the previous cyclone. The material feed is supplied to a succeeding cyclone, and at the cyclone separator prior to the last stage, its discharge is fed into a preheat chamber. As illustrated in the drawing, in the system 2, material supplied through an inlet conduit 11 passes through cyclone separators 13, 14, 15 and 16 which are connected sequentially. In the system 2a material fed through the inlet conduit 11a passes through cyclone separators 13a, 14a, 15a and 16a which are connected in sequence.

By providing the flow arrangement in parallel branches, sufficient distribution of the material can occur in each branch without the requirement of special distribution members. Such special distribution members would have a relatively short operating life because of the high gas temperatures encountered. However, with the division of material flow into separate branches, an adequate and uniform distribution, and a corresponding reduction of the quantity conveyed in each branch is obtainable. This aids in the flameless combustion which occurs.

The material is initially supplied through inlet conduits shown at 11 and 11a which are controlled as shown by a schematic control valve indicated at C. The material then flows sequentially through the cyclones arranged serially in the branches at 2 and 2a, shown separated by the broken line 13. Exhausted heated furnace gases are removed from the initial cyclone by exhaust ventilator blowers 12 and 12a.

Prior to the final cyclones 16 and 16a, the cyclones 15 and 15a feed through material discharges 9 and 10 to preheat chambers 5 and 6. These preheat chambers lead upwardly to the inlet of the cyclones, and each are provided with burners 7 and 8 respectively. Each burner is provided with its individual fuel control to regulate the fuel delivered thereto. It also may be desired to provide a flow control balancing valve as shown at 7a and 8a for the respective preheat chambers to regulate the hot exhaust gases feeding from the furnace. The entire flow of hot exhaust gases flows through a furnace outlet 4 which leads upwardly to divide and flow through the preheat chambers 5 and 6.

The material discharge from the final stage of the separators 16 and 16a is through lines 3 and 3a into the inlet end of the kiln or furnace 1.

It has been found that the arrangement obtains more than merely an increase in capacity of the preheat mechanism and the separator mechanism, but increases in capacity far greater than the increase in flow lines would indicate in that a better more thorough deacidification and treatment occur prior to entry of material into the rotary furnace. The plural parallel systems, however, also provide a greater dexterity in that upon damage to either of the parallel lines, operation of the mechanism can continue without essentially detracting from the quality of the cement clinker. Also, each of the branches can be designed for optimum flow and distribution so that the size of the mechanism can be increased by the provision of additional branches without adversely affecting the preheat operation. While the arrangement is shown with two branches, it will be understood that additional branches may be employed feeding to a unitary furnace and sharing the hot furnaced gas discharge.

We claim as our invention:

1. In an apparatus for thermally treating fine granular material such as for the calcining of cement, the combination comprising:
    a furnace for completing a thermal treatment of a material and having a burner;
    a first preheater changer connected to receive exhaust gases directly from the furnace;
    a burner for said first preheater chamber;
    a second preheater chamber positioned in parallel with the first chamber and connected to receive exhaust gases directly from the furnace;
    a burner for said second preheater chamber;
    a discharge line leading from the furnace directly into said preheater chambers conducting heated gases from the furnace into said preheater chambers;
    a first heat exchanger separator means having a material receiving conduit and heating the material with exhaust gases and separating the material from heated gases connected to discharge to said first preheater chamber and connected to receive gases from said first preheater chamber;
    and a second heat exchanger separator means having a material receiving conduit and heating the material with exhaust gases and separating the material from the gases and discharging to the second preheater chamber and connected to receive gases from said second preheater chamber so that the apparatus is arranged in two parallel material supply paths to the furnace;
    said first and second separator means discharging materials after being preheated directly to the furnace.

2. In an apparatus for thermally treating fine granular material such as for the calcining of cement, constructed in accordance with claim 1, the combination including:
    said first and second separator means each constructed to have plural stages with one stage of each separator means discharging to the first and second preheater chamber respectively and the final stage discharging directly to said furnace.

3. In an apparatus for thermally treating fine granular material such as for the calcining of cement, constructed in accordance with claim 2, the combination wherein:
    each stage is formed of a cyclone separator.

4. In an apparatus for thermally treating fine granular material such as for the calcining of cement, constructed in accordance with claim 1, the combination including:
- means for controlling the flow of gases from the furnace to each preheater chamber independently of the other.

5. In an apparatus for thermally treating fine granular material such as for the calcining of cement, constructed in accordance with claim 1, the combination including:
- the entire heated gas discharge from the furnace being supplied substantially uniformly to each of said preheater chambers.

6. In an apparatus for thermally treating fine granular material such as for the calcining of cement, constructed in accordance with claim 1, the combination including:
- means for controlling the quantity of material received by each of said first and second separator means.

7. In an apparatus for thermally treating fine granular material such as for the calcining of cement, constructed in accordance with claim 1, the combination including:
- first and second exhaust evacuaters respectively connected to said first and second separator means for removing the heated exhaust gases therefrom.

8. A method for thermally treating fine granular material such as for the calcining of cement comprising the steps:
- separately preheating first and second material flows by simultaneously feeding the material to a first heat exchanger separator and to a second heat exchanger separator in parallel with the first and independent from the first separator heating the material with heated gases therein;
- transferring the material from said first and second separators respectively to first and second preheaters and preheating the material therein;
- heating each preheater separately with first and second burners;
- feeding material from each of the preheaters to a common furnace;
- and discharging heated gases directly from the furnace to flow directly in divided paths in parallel through the preheaters to augment the heat of said burners.

9. A method for thermally treating fine granular material such as for the calcining of cement in accordance with the steps of claim 8:
- including separating the material in stages in the separators and supplying the material from one stage to the preheaters and supplying the material from the preheaters to the final stage and then to the furnace.

10. A method for thermally treating fine granular material such as for the calcining of cement in accordance with the steps of claim 8:
- including using cyclone separators for the stages for separation of the heated gases from the material and causing intimate contact between the gases and material.

* * * * *